S. H. TIMMONS.
Car Brake.
No. 60,284.
2 Sheets—Sheet 1.
Patented Dec. 4, 1866.
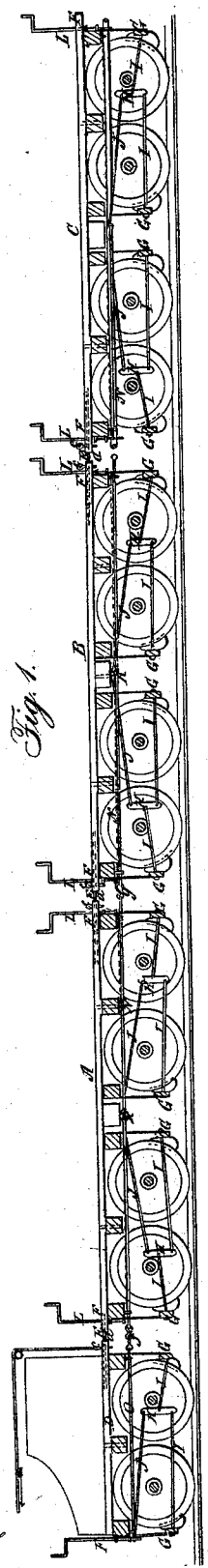
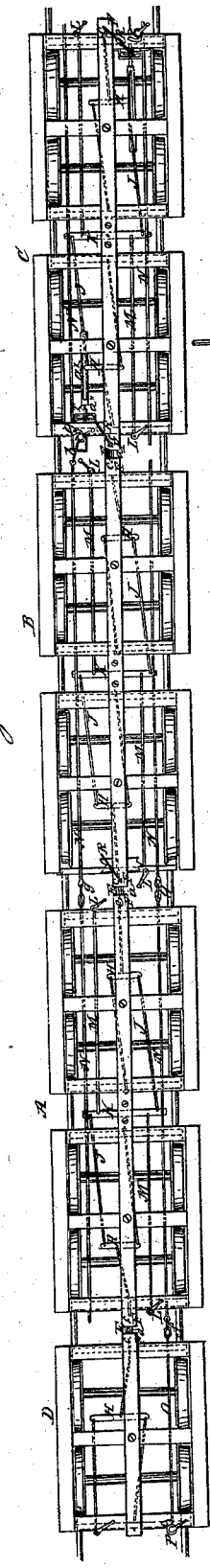
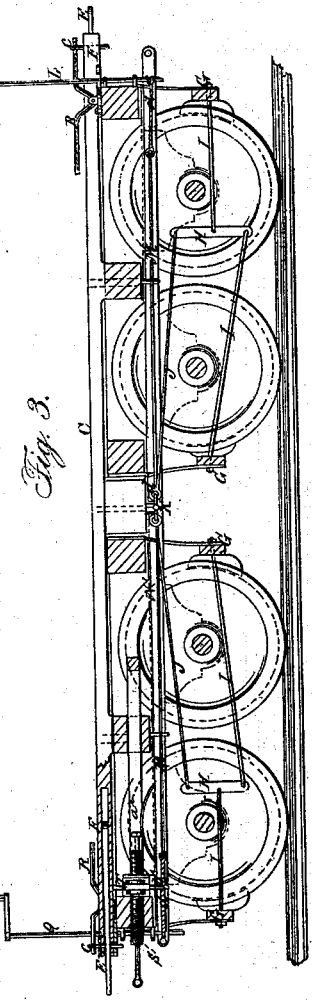
Witnesses:
Inventor:
Samuel H. Timmons S. H. TIMMONS.
Car Brake.
No. 60,284.
2 Sheets—Sheet 2.
Patented Dec. 4, 1866.
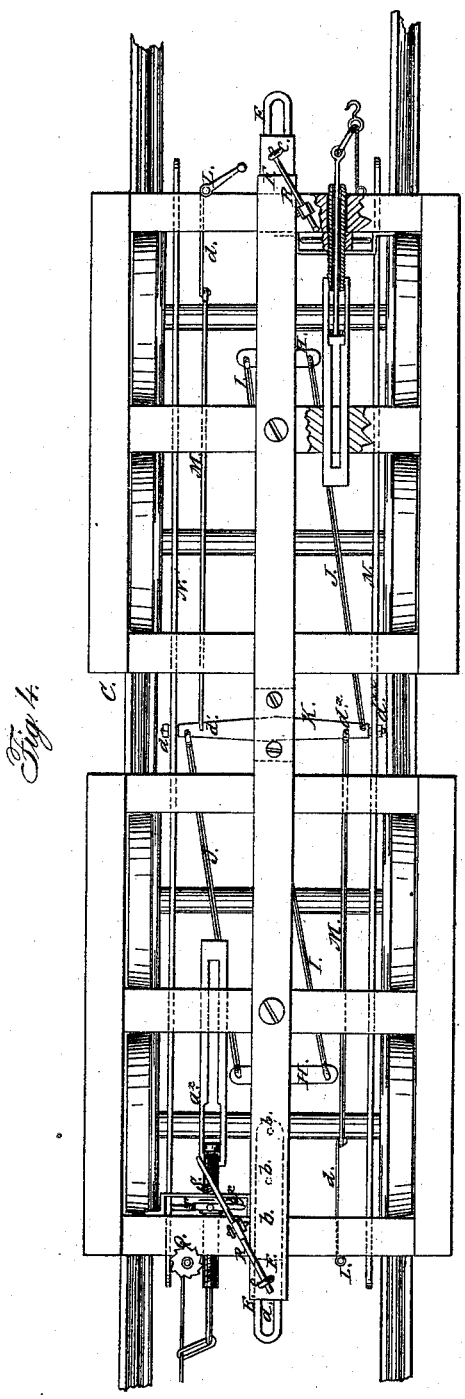
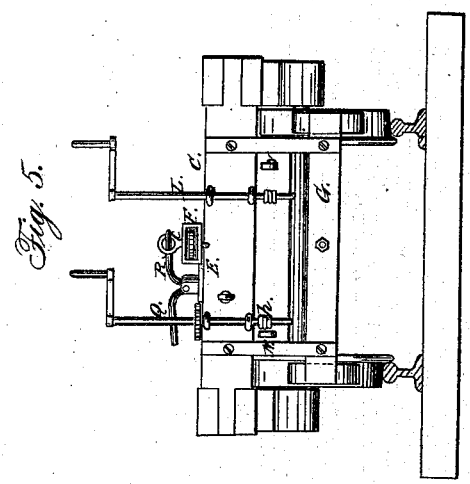
Witnesses:
Inventor:

United States Patent Office.

IMPROVED CAR BRAKE.

SAMUEL H. TIMMONS, OF LA FAYETTE, INDIANA.

Letters Patent No. 60,284, dated December 4, 1866.

SPECIFICATION.

TO ALL WHOM IT MAY CONCERN:

Be it known that I, SAMUEL H. TIMMONS, of La Fayette, in the county of Tippecanoe, and State of Indiana, have invented a new and improved Railroad Car Brake; and I do hereby declare that the following is a full, clear, and exact description thereof, which will enable those skilled in the art to make and use the same, reference being had to the accompanying drawings, forming part of this specification, in which—

Figure 1, sheet No. 1, is a side sectional view of the trucks of a train of cars, having my improved brake applied to them.

Figure 2, a plan or top view of the same.

Figure 3, an enlarged side sectional view of a single car truck, having my improvement applied to it.

Figure 4, sheet No. 2, an enlarged plan or top view of a single car truck, provided with my improvement; and Figure 5, an end view of the same.

Similar letters of reference indicate corresponding parts.

This invention relates to a new and improved brake for railroad cars, by which all the brakes of a train, or series of cars, may be simultaneously applied, and by a very simple means connected with the ordinary brakes in use.

A B C represent the trucks or running gear of three cars, and D the truck or running gear of the tender of a locomotive. These trucks are connected together by a coupling similar or equivalent to the ordinary link and pin in common use, the only difference being that the links E are formed in long plates, which are allowed to slide in the draw-heads F, and in addition to the link portion $a$, are perforated with holes $b$, to receive the drop pins $c$, as will be fully understood by referring to the dotted lines in fig. 4. Each car is provided with the usual or ordinary brake mechanism, (see more particularly figs. 3 and 4,) G being the shoe-bars, connected to a lever H by rods I, and the levers H of the two trucks of each car connected by rods J to an equalizer K, the vertical windlass arbors I, at each end of the frame, being connected by chains $d$ to rods M, attached to the equalizer, as shown at $d^x$. These parts, comprising the brake in present use, being well known, do not require a minute description. N N' represent parallel rods, which extend the whole length of each car frame or bed, and are connected to the equalizers K. as shown at $d^{xx}$. In the tender truck D there is fitted longitudinally a rod O, the front end of which is connected by a chain, $e$, to a windlass P, and the rear end of this rod O is connected by a chain, $f$, with one of the rods N of the car bed, a frame, A, in its rear, (see fig. 2;) and the rear ends of the rods N N' of the car frame or bed A are both connected by chains $g\ g$ with the front ends of the rods N N' of the car bed or frame B, while the rear end of the rod N' of the car frame or bed B is connected by a chain, $h$, with a windlass Q on the front end of the rear car frame or bed C.

From the above description it will be seen that the several cars of a train are not only all connected by the usual link couplings, or a coupling equivalent thereto, but that the brakes of the several cars are also all connected. The chains, however, which form a connection between the rods N N' of the several cars are sufficiently long to admit of all the cars being drawn through the medium of the several couplings when it is not required to apply the brakes.

The operation is as follows: When it is necessary to apply the brakes, the engineer shuts off the steam, the brakeman at windlass P on the tender, and one on the rear car C, at the windlass Q, either or both of them, take up the slack of the chains $f\ g\ g\ h$, and the brakeman on C then, through the medium of windlass I, on C, applies the brakes to the wheels of the rear car C, which consequently drags, and the pull of the locomotive is transmitted through the whole train by the rods N N', and the brakes of all the cars will be applied. This operation admits of a gradual application of the brakes.

When an instantaneous application of the brakes is required, and there is not time to take up the slack, the engineer, as soon as he cuts off the steam, raises the pin $c$ of the draw-head of the tender, and thereby releases the locomotive and tender from the train, and the brakeman on the rear car C also releases that car in a similar manner, and then applies the brakes of the rear car C, which causes the latter to drag, and the brakes of all the cars will be instantly applied. By this arrangement it will be seen that, in case of the casual detachment of any car of a train, the brakes of all the cars will be instantly applied, without any manipulation whatever.

In order to facilitate the raising of the drop pins $c$, foot levers R may be used, as shown in figs. 3, 4, and 5.

In certain cases, where it would be advisable to apply the brakes by a direct application of hand power alone, I use a screw S, as shown clearly in figs. 3 and 4. These screws may be at one or both ends of the cars, so that one or both rods N N' may be actuated as desired. These screws S are placed within suitable guides $a^x$, and have nuts T on them, provided with arms $b^x$, to serve as levers or handles, as shown clearly in figs. 3 and 4.

Having thus described my invention, what I claim as new, and desire to secure by Letters Patent, is—

1. The connecting of the brakes of a train or series of cars by means of rods N N', or their equivalents, in such a manner that, by applying the brakes to the wheels of any one of the cars, the pull of the locomotive, or draught, will be transmitted through said connections to the several brakes, and the latter all applied, substantially as shown and described.

2. The rods N N', or their equivalents, when applied in such a manner as to serve the double purpose of a brake connection and a car coupling, substantially as set forth.

3. The screws S and nuts T, applied to the rods N N', for the purpose of operating or applying power to the brakes, substantially as set forth.

SAMUEL H. TIMMONS.

Witnesses:
 WM. F. McNAMARA,
 A. R. HAIGHT.

60,284